(12) United States Patent
Bates et al.

(10) Patent No.: US 9,215,579 B2
(45) Date of Patent: Dec. 15, 2015

(54) ALARM SIGNAL CONVERSION FOR TRANSMISSION OVER PACKET-BASED NETWORKS

(71) Applicant: Cellco Partnership, Basking Ridge, NJ (US)

(72) Inventors: Peter C. Bates, Morristown, NJ (US); Edward Gruskin, Verona, NJ (US); Nishit Oza, North Andover, MA (US)

(73) Assignee: Cellco Partnership, Basking Ridge, NJ (US)

( * ) Notice: Subject to any disclaimer, the term of this patent is extended or adjusted under 35 U.S.C. 154(b) by 11 days.

(21) Appl. No.: 13/793,131

(22) Filed: Mar. 11, 2013

(65) Prior Publication Data

US 2014/0256281 A1    Sep. 11, 2014

(51) Int. Cl.
*H04W 4/22* (2009.01)

(52) U.S. Cl.
CPC ........................................ *H04W 4/22* (2013.01)

(58) Field of Classification Search
CPC ...... G08B 25/08; G08B 21/084; G08B 29/10; G08B 13/2417; H02J 7/0026; G01S 13/003; G01S 13/0209; G04G 13/023; G04G 9/0047; H04M 11/00; H04M 1/00; H04M 3/08; H04M 3/432
USPC ................. 455/404.1, 41.2; 340/540; 370/39; 704/214
See application file for complete search history.

(56) References Cited

U.S. PATENT DOCUMENTS

| 4,993,059 | A  | * | 2/1991  | Smith et al. ..................... 379/39 |
| 7,542,721 | B1 | * | 6/2009  | Bonner et al. ............... 455/41.2 |
| 7,680,505 | B2 |   | 3/2010  | Tarleton et al. |
| 8,315,858 | B1 | * | 11/2012 | Legl et al. ..................... 704/214 |
| 2010/0114527 | A1 | * | 5/2010 | Lee ............................. 702/181 |
| 2012/0157034 | A1 | * | 6/2012 | Martin et al. ............... 455/404.1 |
| 2012/0188080 | A1 | * | 7/2012 | Haupt et al. .................. 340/540 |

\* cited by examiner

*Primary Examiner* — Lester Kincaid
*Assistant Examiner* — Gary Lafontant

(57) ABSTRACT

A computing device is configured to receive an analog alarm signal from an alarm receiving device; convert the analog alarm signal into a packet-based message having information equivalent information as the analog alarm signal; and provide the packet-based message to a server device associated with an alarm monitoring station. The packet-based message may contain information that is used to identify the alarm signal or used to respond to the alarm signal.

20 Claims, 5 Drawing Sheets

ALARM SIGNAL CONVERSION FOR TRANSMISSION OVER PACKET-BASED NETWORKS

BACKGROUND

Alarm systems sometimes provide alarm messages to an alarm monitoring station via an analog landline telephone network, such as an analog Public Switched Telephone Network (PSTN) and/or an analog plain old telephone service (POTS) network. The alarm systems may provide the alarm message, via the analog landline telephone network, by sending a dual-tone multi-frequency (DTMF) signal (e.g., a series of audible tones approximately 50 milliseconds (ms) to approximately 100 ms in length). The transmission of the alarm message often fails (e.g., incurs data loss) when the alarm message is transmitted using a cellular network, for example, as a result of sampling rates and sampling sizes associated with codecs of the cellular network and/or other constraints on the cellular network that prevent the alarm signal from being transmitted to the alarm monitoring station.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may convert an alarm signal for transmission over a cellular network and/or some other type of packet-based network (e.g., a code division multiple access (CDMA) network, a global system for mobile (GSM) network, a voice over internet protocol (VoIP) network, a computer network, a digital subscriber line (DSL) network, the internet, etc.). For example, the systems and/or methods may convert an alarm signal from a DTMF type signal (or some other type of analog signal) to an equivalent packet-based message (e.g., a message having the same information as the DTMF type signal) that can be transmitted over the cellular network or another type of packet-based network without data loss (e.g., for networks that may not be able to process a DTMF type signal).

Figure 1:
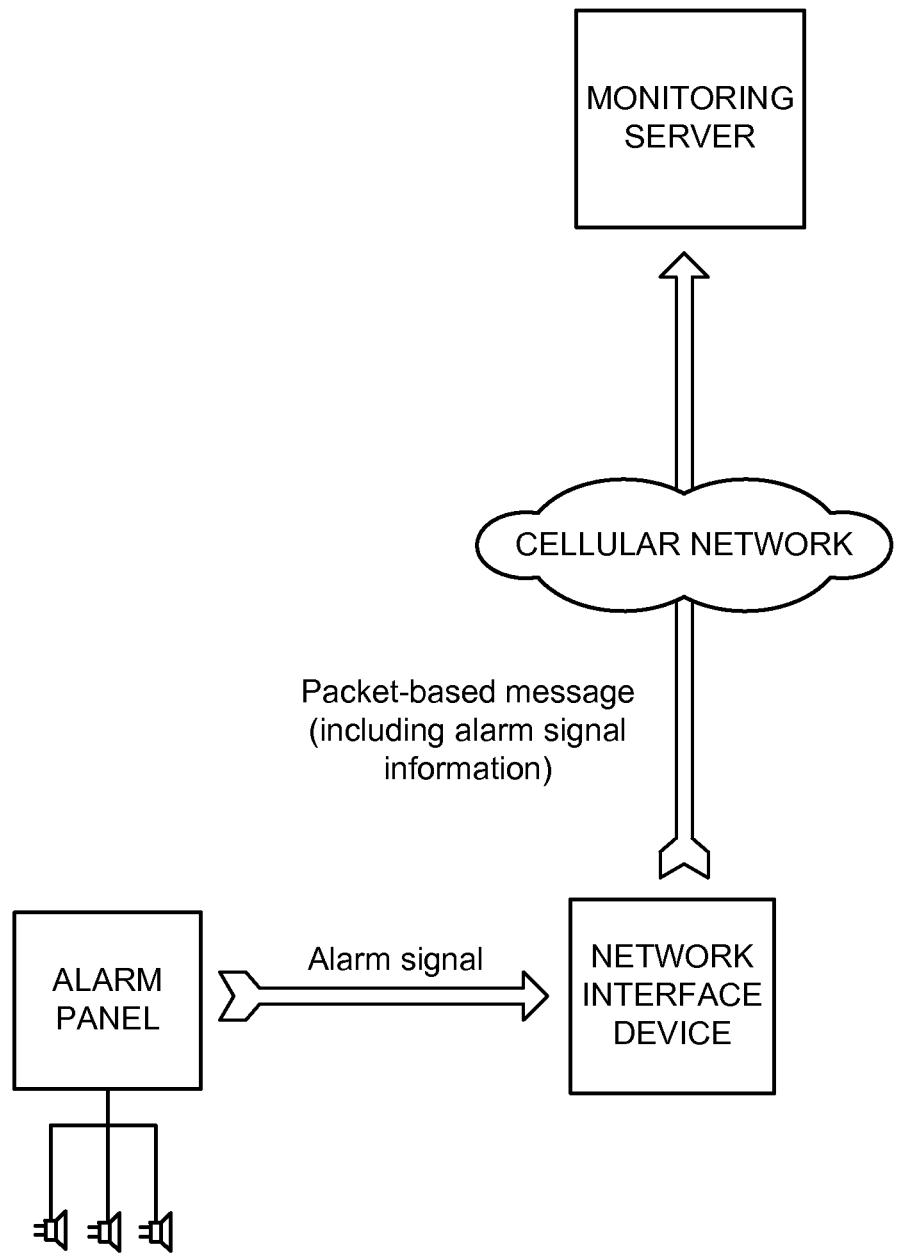
FIG. 1 illustrates an example overview of an implementation described herein.

FIG. 1 illustrates an example overview of an implementation described herein. In FIG. 1, assume that an alarm panel receives an electrical signal from a sensor device in a facility (e.g., a home, an office, a warehouse, an office building, or some other type of facility). Further, assume that the sensor device provides the electrical signal based on detecting the occurrence of a particular event (e.g., the opening of a door or window, a forced-entry intrusion, a fire, an intrusion of carbon monoxide, an intrusion of water, etc.). Given these assumptions, the alarm panel may provide the alarm signal to a network interface device. For example, the alarm panel may function as an analog telephone handset and may send the alarm by placing a telephone call to send the alarm signal. In some implementations, the alarm signal may be in the form of a DTMF type signal including a series of audible tones corresponding to digits dialed by the alarm panel. Additionally, or alternatively, the alarm signal may be in some other format. In some implementations, the alarm panel may cause one or more speaker devices in the facility to output an audible noise to alert individuals in and/or around the facility of the alarm signal.

In some implementations, the network interface device may receive the alarm signal and may perform an alarm signal conversion function to convert the alarm signal into a packet-based message including equivalent information (e.g., the same information) associated with the alarm signal. In some implementations, the network interface device may provide the packet-based message to a monitoring server via a cellular network. In some implementations, the monitoring server may be located in an alarm monitoring station and may alert an operator that an alarm signal (e.g., the packet-based message identifying the alarm signal) has been received (e.g., to allow the operator to respond to the alarm signal by dispatching police/fire services, calling an owner of the facility associated with the alarm signal, or performing some other action to respond to the alarm signal).

As a result, the monitoring server may receive an alarm signal (e.g., via a packet-based network) from an alarm panel that provides alarm signals in the form of a DTMF type signal. In some implementations, alarm systems having alarm panels that provide alarm signals in the form of a DTMF type signal may be retrofitted such that the monitoring server may receive, via a packet-based network, a packet-based message identifying an alarm signal.

While a cellular network is shown in FIG. 1, in practice, the network interface device may provide a packet-based message using some other type of network, such as a VoIP network, a computer network, a DSL network, the internet, or the like.

Figure 2:
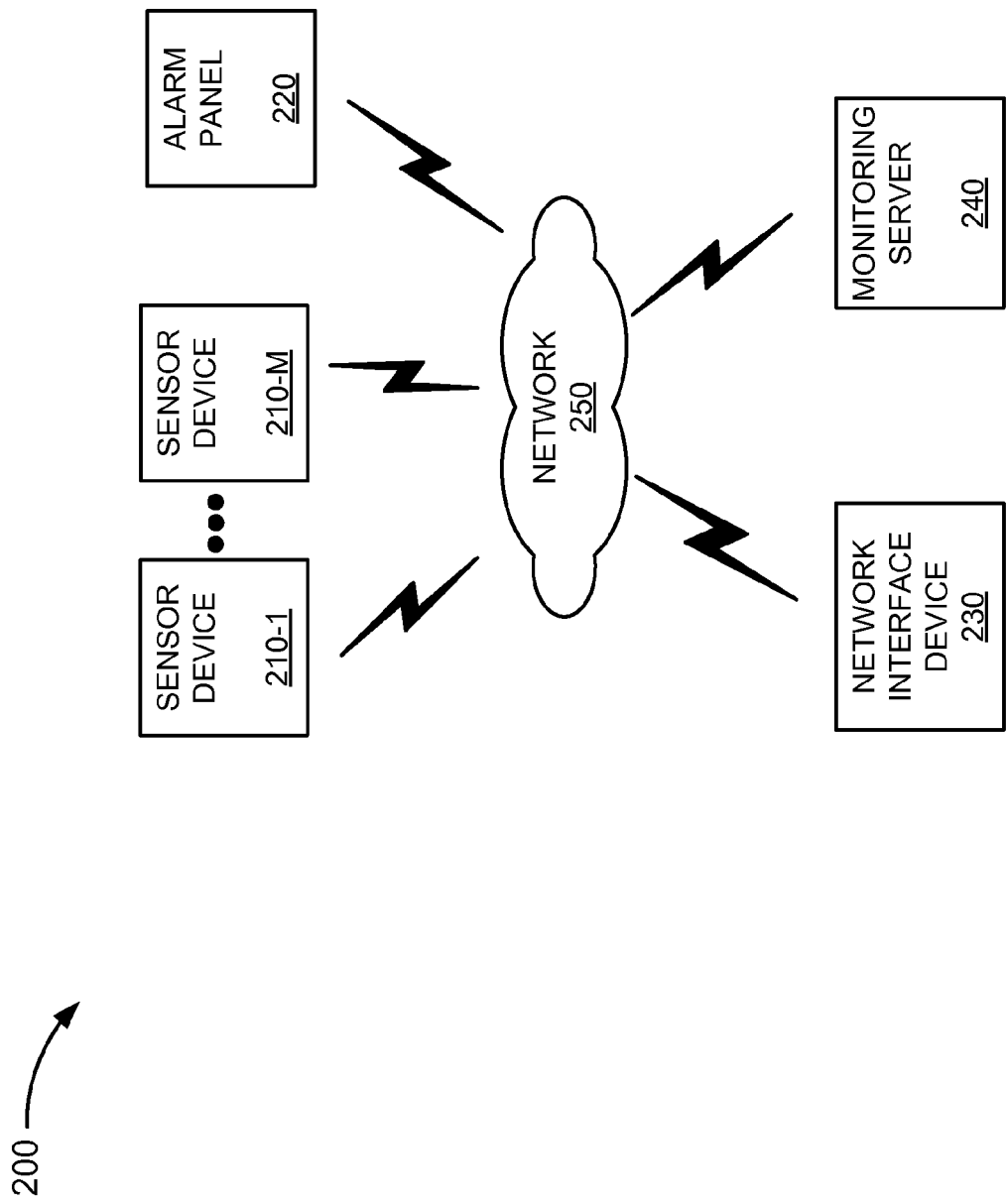
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include sensor devices 210-1, ..., 210-M (where M≥1), alarm panel 220, network interface device 230, monitoring server 240, and network 250.

Sensor device 210 may include a device that detects an event, such as the opening of a door or window, a forced-entry intrusion, an intrusion of carbon monoxide, an intrusion of water, a fire, smoke, object motion, and/or some other type of event in or around a facility. For example, sensor device 210 may include a motion detector, an air temperature sensor, a fluid temperature sensor (e.g., a water heater temperature sensor), a glass-break sensor, a door/window sensor, a switch, and/or some other type of sensor or group of sensors. In some implementations, sensor device 210 may report the occurrence of an event to alarm panel 220 based on detecting the occurrence of the event. For example, the occurrence of the event may cause a switch, associated with sensor device 210, to trip or close, thereby causing sensor device 210 to send an electrical signal to a particular terminal of alarm panel 220 connected to sensor device 210. In some implementations, a facility may include one or more sensor devices 210 as part of a facility alarm and/or monitoring system.

Alarm panel 220 may include an electronic panel that receives an electrical signal, from sensor device 210, corresponding to the occurrence of an event. In some implementations, alarm panel 220 may provide an alarm signal based on receiving the electrical signal. In some implementations, alarm panel 220 may include an RJ-31 interface to provide the alarm signal. As described above, the alarm signal may be in the form of a DTMF signal and/or some other type of signal. In some implementations, the alarm signal may identify a particular facility (e.g., an account number associated with the particular facility), a type of the alarm signal, a location or zone of the alarm signal, and/or some other information relating to the alarm signal. In some implementations, alarm panel 220 may be located in the particular facility and may receive electrical signals from multiple sensor devices 210 located in or around the particular facility. For example, alarm panel 220 may include multiple terminals with each terminal connected to a particular sensor device 210.

Network interface device 230 may include a computing device, such as a server device, a desktop device, or some other type of computing device. In some implementations, network interface device 230 may include an RJ-31 interface to receive an alarm signal from alarm panel 220 (e.g., using an analog voice interface of network interface device 230). In some implementations, network interface device 230 may be implemented in a facility having an associated alarm system. Additionally, or alternatively, network interface device 230 may be implemented in some other location. In some implementations, network interface device 230 may convert the alarm signal to a packet-based message having the same information as the alarm signal. For example, the packet-based message may identify a type of the alarm signal, a location or zone of the alarm signal, and/or some other information relating to the alarm signal. In some implementations, network interface device 230 may provide the packet-based message to monitoring server 240. In some implementations, network interface device 230 may include a cellular antenna to provide the packet-based message via a cellular network.

Monitoring server 240 may include a computing device, such as a server device, or a collection of server devices. As described above, monitoring server 240 may be located in an alarm monitoring station and may alert an operator that an alarm signal (e.g., a packet-based message identifying the alarm signal) has been received (e.g., to allow the operator to respond to the alarm signal). For example, monitoring server 240 may include an interface that can receive the packet-based message from network 250 (e.g., the internet). Additionally, or alternatively, monitoring server 240 may receive an alarm signal in the form of a DTMF signal. For example, monitoring server 240 may answer a telephone call from alarm panel 220 and may receive the DTMF signal via the telephone call from alarm panel 220.

Network 250 may include one or more wired and/or wireless packet-based networks that may transmit packet-based messages. For example, network 250 may include a cellular network, a public land mobile network (PLMN), a public switched telephone network (PSTN), a second generation (2G) network, a third generation (3G) network, a fourth generation (4G) network, a fifth generation (5G) network, and/or another network. Additionally, or alternatively, network 250 may include a local area network (LAN), a wide area network (WAN), a metropolitan network (MAN), an ad hoc network, a managed IP network, a virtual private network (VPN), an intranet, the Internet, a fiber optic-based network, a DSL network, and/or a combination of these or other types of networks. In some implementations, network 250 may include a sensor network to connect sensor devices 210 to one or more alarm panels 220 (e.g., via terminals in alarm panels 250). In some implementations, network 250 may include a facility network to interconnect one or more communications devices throughout a facility associated with an alarm system. For example, network 250 may interconnect telephones, computer network devices, power lines, video distribution lines.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections (e.g., category 3 wiring, category 5 wiring, or some type of structured wiring), wireless connections (e.g., wireless fidelity (Wi-Fi), Zigbee, Z-wave, or some other type or wireless connection), or a combination of wired and wireless connections.

Figure 3:
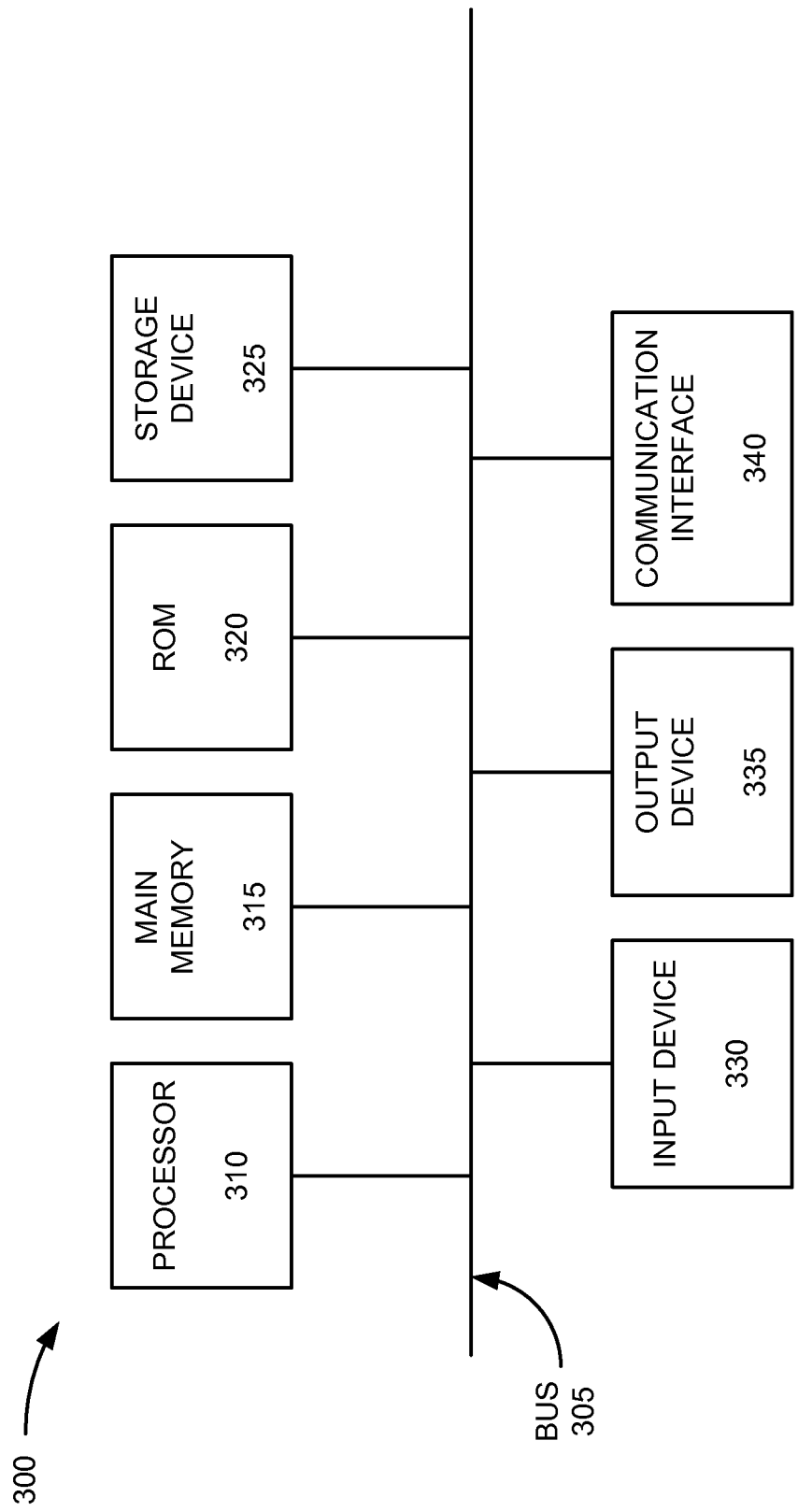
FIG. 3 illustrates example components of a device that may be used within the environment of FIG. 2.

FIG. 3 illustrates example components of a device 300 that may be used within environment 200 of FIG. 2. Device 300 may correspond to sensor device 210, alarm panel 220, network interface device 230, and/or monitoring server 240. Each of sensor device 210, alarm panel 220, network interface device 230, and/or monitoring server 240 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application-specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
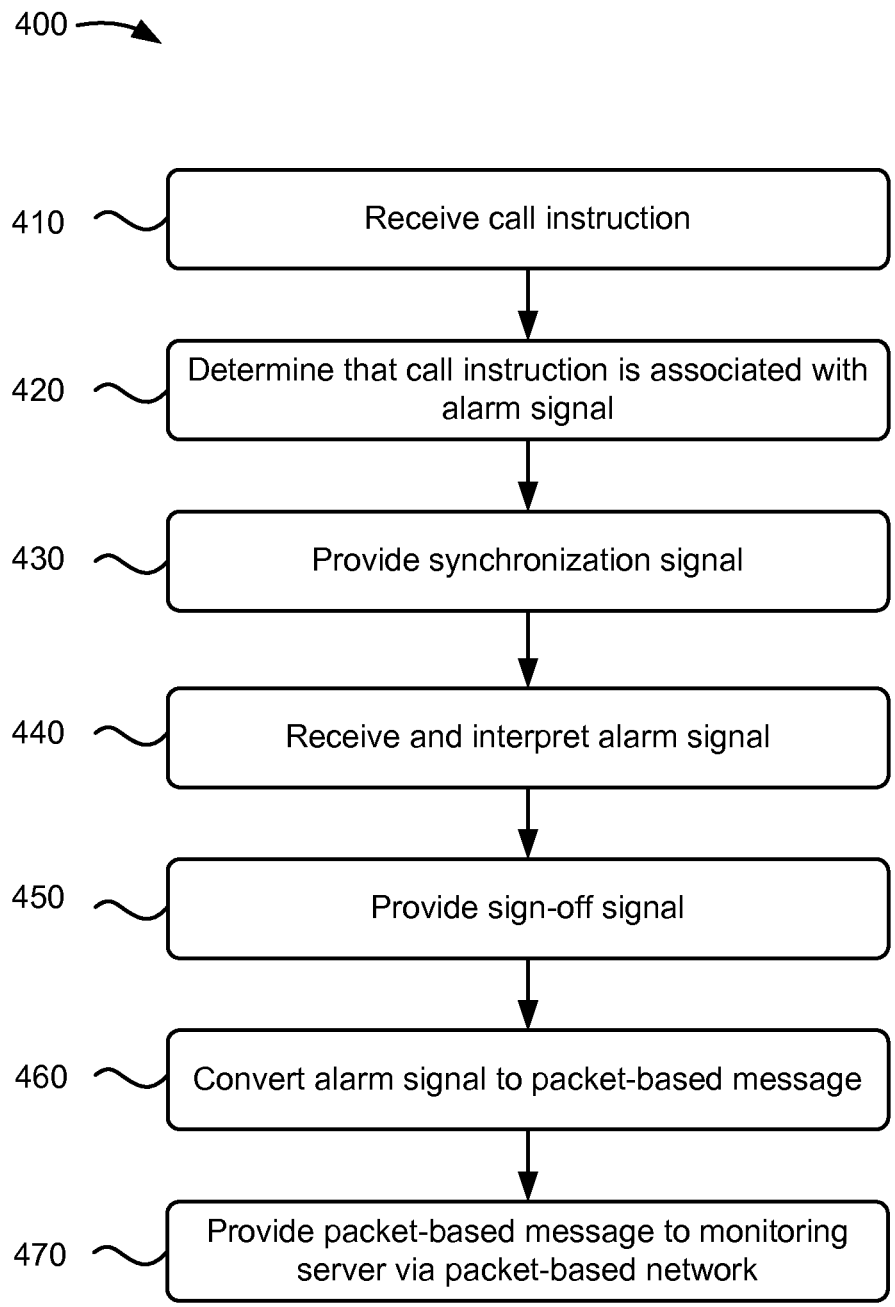
FIG. 4 illustrates a flowchart of an example process for converting an alarm signal for transmission over a cellular network.

FIG. 4 illustrates a flowchart of an example process 400 for converting an alarm signal for transmission over a cellular network. In one implementation, process 400 may be performed by one or more components of network interface device 230. In another implementation, some or all of blocks of process 400 may be performed by one or more components of another device in environment 200 (e.g., alarm panel 220 and/or monitoring server 240), or a group of devices including or excluding network interface device 230.

As shown in FIG. 4, process 400 may include receiving a call instruction (block 410). For example, network interface device 230 may receive a call instruction from alarm panel 220. In some implementations, alarm panel 220 may provide the call instruction when receiving an electrical signal from sensor device 210 that identifies the occurrence of an event (e.g., a break-in, a fire, smoke, etc.) at a facility. For example, alarm panel 220 may provide the call instruction by placing a call intended for an alarm monitoring station (e.g., by dialing a telephone number, such as a telephone number associated with the alarm monitoring station).

In some implementations, alarm panel 220 may use an RJ-31 interface to seize control of a communications channel in a telephone network in the facility based on receiving the electrical signal from sensor device 210. In some implementations, alarm panel 220 may terminate any connections in the communications channel in order to provide the call instruction. In some implementations, network interface device 230 may receive the call instruction based on determining that alarm panel 220 has gone "off-hook" (e.g., has signaled that alarm panel 220 is in the process of placing a call) and intercepting the call instruction placed by alarm panel 220 and intended for the alarm monitoring station.

Process 400 may also include determining that the call instruction is associated with an alarm signal (block 420). For example, network interface device 230 may determine that the call instruction is associated with an alarm signal based on identifying that the call instruction includes an instruction to call a telephone number associated with the alarm monitoring station (e.g., using a caller ID function and/or using some other technique). For example, network interface device 230 may store information that identifies the telephone number associated with the alarm monitoring station. In some implementations, network interface device 230 may determine that the call instruction is not associated with an alarm signal (e.g., when the call instruction includes an instruction to call a telephone number that is not associated with the alarm monitoring station).

Process 400 may further include providing a synchronization signal (block 430). For example, when network interface device 230 determines that the call instruction is associated with an alarm signal, network interface device 230 may answer the call, placed by alarm panel 220, and may provide the synchronization signal to alarm panel 220 based on answering the call. In some implementations, the synchronization signal may instruct alarm panel 220 to provide the alarm signal to network interface device 230. In some implementations, the synchronization signal may correspond to a tone-based handshake between network interface device 230 and alarm panel 220.

Alternatively, (e.g., when network interface device 230 determines that the call instruction is not associated with an alarm signal), network interface device 230 may not answer the call and may allow the call instruction to be sent to the telephone number associated with the call instruction.

Process 400 may also include receiving and interpreting the alarm signal (block 440). For example, network interface device 230 may receive the alarm signal from alarm panel 220 (e.g., when alarm panel 220 receives the synchronization signal from network interface device 230 and provides the alarm signal). As described above, the alarm signal may be a DTMF type signal or some other type of analog signal. For example, alarm panel 220 may send the alarm signal by dialing a series of digits using a dialer of alarm panel 220. In some implementations, the alarm signal may include a series of audible tones and/or pauses corresponding to the series of digits dialed by alarm panel 220. In some implementations, the alarm signal may include a series of pulse-dialed digits. In some implementations, network interface device 230 may use an analog voice interface to receive the alarm signal and the associated series of audible tones and/or pauses. In some implementations, network interface device 230 may interpret a tone based on a frequency of the tone, based on a dial plan associated with network interface device 230, and/or based on some other information. For example, network interface device 230 may use a DC9 protocol, a contact ID protocol, and/or some other type of protocol to interpret the tone.

In some implementations, network interface device 230 may identify a set of digits from the series of tones associated with the alarm signal (e.g., a particular tone may correspond to a particular digit). Additionally, network interface device 230 may identify another set of digits based on a pause followed by another series of tones. In some implementations, one or more sets of digits may identify information, such as a type of the alarm signal, a location or zone of the alarm signal, an account number associated with the alarm signal (e.g., to identify a particular facility associated with the alarm signal), and/or some other information associated with the alarm signal.

Process 400 may further include providing a sign-off signal (block 450). For example, network interface device 230 may provide the sign-off signal to alarm panel 220 when network interface device 230 receives an entire portion of the alarm signal. In some implementations, network interface device 230 may determine that the entire portion of the alarm signal has been received based on an audio pattern of the alarm signal. For example, the network interface device 230 may determine that the entire portion of the alarm signal has been received when an audible tone has not been received from alarm panel 220 for a particular period of time. Additionally, or alternatively, network interface device 230 may determine that the entire portion of the alarm signal has been received based on a particular pattern of a series of audible tones having been received from alarm panel 220.

In some implementations, the sign-off signal may include an audible burst of noise that alarm panel 220 may interpret to terminate the call used to provide the alarm signal and/or the associated tones (e.g., to prevent network interface device 230 from receiving additional noise and/or tones that may corrupt the alarm signal). In some implementations, alarm panel 220 may retry sending the alarm signal until alarm panel 220 receives the sign-off signal. In some implementations, alarm panel 220 may place a call to another telephone number or perform some other action when alarm panel 220 does not receive the sign-off signal within a particular period of time of sending the alarm signal.

Process 400 may also include converting the alarm signal to a packet-based message (block 460). For example, network interface device 230 may convert the alarm signal by forming a packet-based message having the same information as the information associated with the alarm signal. As described above, network interface device 230 may identify one or more sets of digits when interpreting the alarm signal. In some implementations, network interface device 230 may form a packet-based message having the one or more sets of digits and/or having information associated with the one or more sets of digits. For example, network interface device 230 may store the one or more sets of digits in a packet-based message to convert the alarm signal in to the packet-based message.

For example, the packet-based message may identify that a first set of digits is associated with an account number, a second set of digits is associated with an event code (e.g., a type of the alarm signal), a third set of digits is associated with a location or zone of the alarm signal, and so on. In some implementations, the packet-based message may include a text file, an encrypted file, a computer executable file, and/or some other type of file that include the multiple sets of digits. In some implementations, the packet-based message may include raw coded data in an extensible mark-up language (XML) format, a hypertext markup language (HTML) format, extreme discovery protocol (EDP) format, a user datagram protocol (UDP) format, a transmission control protocol (TCP) format, and/or some other format.

Process 400 may further include providing the packet-based message to a monitoring server via a packet-based network (block 470). For example, network interface device 230 may provide the packet-based message to monitoring server 240 via the packet-based network, such as a cellular network using a cellular antenna associated with network interface device 230. Additionally, or alternatively, network interface device 230 may provide the packet-based message to monitoring server 240 via some other type of network using some other technique.

In some implementations (e.g., when network interface device 230 utilizes a cellular network to provide the packet-based message), network interface device 230 may connect with a cellular base station (e.g., an eNodeB device, or some other type of cellular base station) to connect to network 250 and to provide the packet-based message via network 250. As described above, monitoring server 240 may include an interface (e.g., an Ethernet interface, a LAN interface, a WLAN interface, or some other type of interface) to receive the packet based message from network interface device 230 via network 250.

In some implementations, monitoring server 240 may read the packet-based message and may identify the one or more sets of digits included in the packet-based message. For example, monitoring server 240 may perform a database lookup function to map the one or more sets of digits to a geographic location associated with the alarm signal, a zone associated with the alarm signal, an alarm type associated with the alarm signal, etc. As a result, monitoring server 240 may receive the packet-based message having equivalent information as a DTMF type signal.

As described above, an operator of monitoring server 240 may receive the packet-based message and may respond to the alarm signal associated with the packet-based message. For example, the operator may call a telephone number associated with the facility of the alarm message, may dispatch emergency personnel, and/or may perform some other action in response to receiving the packet-based message.

While a particular series of blocks has been described above with regard to FIG. 4, the operations, data flows, and/or the order of the blocks may be modified in other implementations. Further, non-dependent operations and/or data flows may be performed in parallel. In some implementations, alarm panel 220 may form an alarm signal as a packet-based message in lieu of forming the alarm signal as DTMF signal. In this scenario, alarm panel 220 may provide the packet-based message to monitoring server 240 without involving network interface device 230.

In some implementations, network interface device 230 may perform some other operation in addition to, or instead of operations described in blocks 460-470. For example, a particular string of digits may direct network interface device 230 to translate the particular string of digits to an E.164 telephone number and to initiate a connection (e.g., a telephone connection) to that telephone number.

Figure 5:
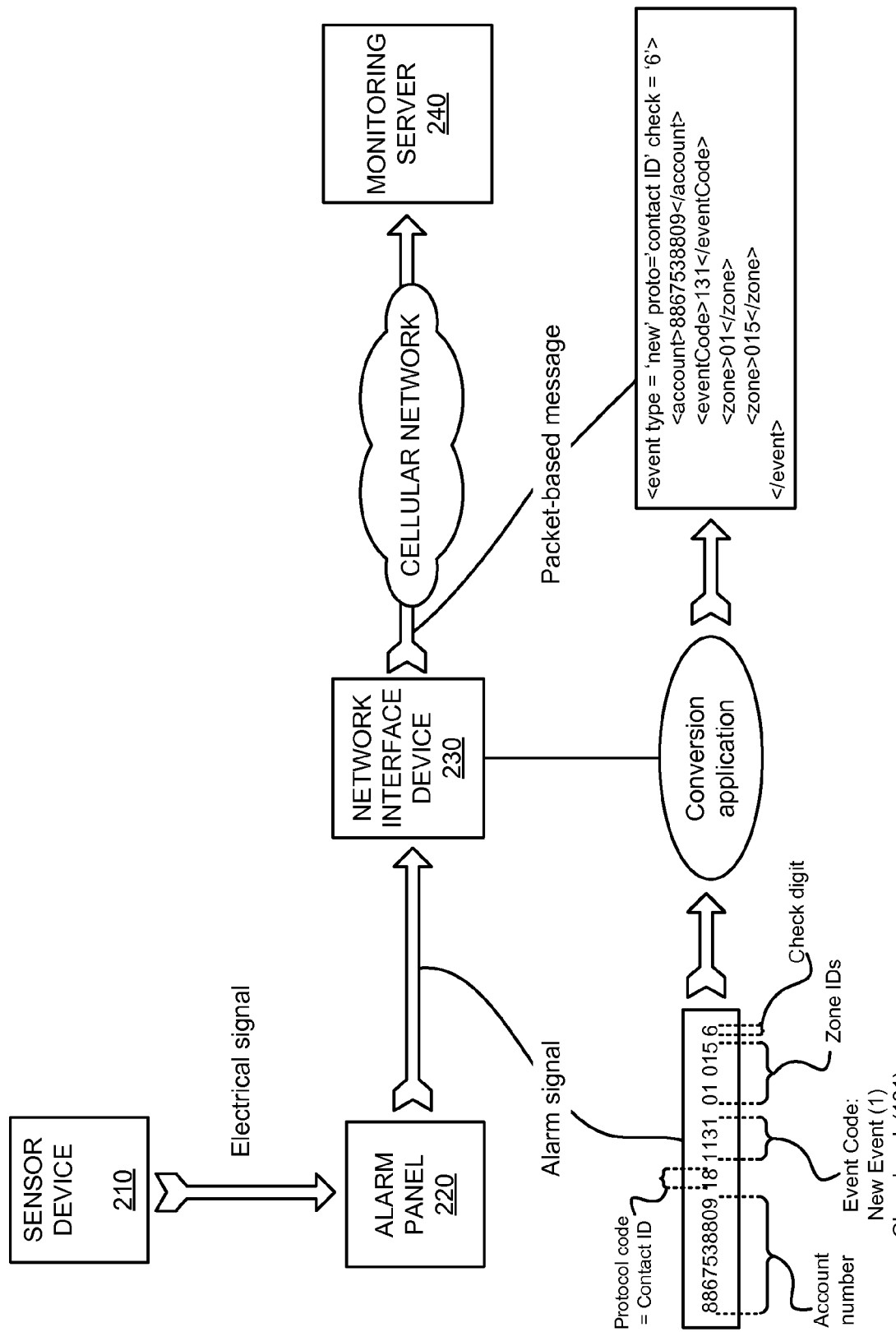
FIG. 5 illustrates an example implementation as described herein.

FIG. 5 illustrates an example implementation as described herein. In FIG. 5, assume that sensor device 210 detects the occurrence of a particular event (e.g., a forced intrusion into a facility associated with sensor device 210, a water intrusion, or the like). Given this assumption, sensor device 210 may send an electrical signal to alarm panel 220 (e.g., via a sensor network of network 250). In some implementations, alarm panel 220 may identify a type of alarm based on the type of sensor device 210 associated with a terminal of alarm panel 220 via which the electrical signal was received. Additionally, or alternatively, alarm panel 220 may identify a zone in which sensor device 210 is located based on the terminal of alarm panel 220 via which the electrical signal was received. For example, assume that the electrical signal was received via a particular terminal of alarm panel 220 that is associated with zone #1 and associated with a glass-break type sensor. Given this assumption, alarm panel 220 may determine the zone (e.g., zone #1) and/or the alarm type (e.g., a glass-break alarm type) based on receiving the electrical signal via the particular terminal.

As further shown in FIG. 5, alarm panel 220 may generate an alarm signal based on receiving the electrical signal. In some implementations, the alarm signal may include one or more sets of digits that identify an account number associated with alarm panel 220 (e.g., to identify a particular facility associated with alarm panel 220), a protocol code that identifies a protocol type used to identify a response instruction for an operator of monitoring server 240, a check digit (e.g., for error detection in the alarm signal), an event code that identifies an alarm type, a zone code, and/or some other information associated with the alarm signal. As described above, alarm panel 220 may provide the alarm signal to network interface device 230 (e.g., via a facility network of network 250). In FIG. 5, assume that the alarm signal is a DTMF type signal.

Given this assumption, network interface device 230 may convert the alarm signal from a DTMF type signal to a packet-based type signal in accordance with process 400 as described above. As further shown in FIG. 5, the packet-based message may include a contact ID corresponding to the protocol code, the check digit, the event code, the zone code, and/or some other information associated with the alarm signal. As described above, the packet-based message may include the same information as the alarm signal. As further shown in FIG. 5, monitoring server 240 may receive the packet-based message (e.g., via a cellular network or via another type of packet-based network or combination of packet-based networks) such that an operator may respond to the alarm signal associated with the packet-based message.

While a particular example is shown in FIG. 5, it will be apparent that the above description is merely an example implementation. For example, in practice, the packet-based message may have different information than what is shown and/or may be in a different format than what is shown in FIG. 5. Also, the packet-based message may include additional information not shown in FIG. 5. For example, the packet-based message may include information to identify an emergency telephone number, associated with the alarm signal, that may be contacted. Additionally, or alternatively, the packet-based message may include information to identify a geographic location (e.g., an address) of a facility associated with the alarm signal.

In some implementations, monitoring server 240 may communicate with a directory service to identify a telephone number associated with the facility based on the address of the facility, such as a landline telephone number associated with the facility and/or a mobile phone number of an owner or administrator associated with the facility. In some implementations, monitoring server 240 may provide an alert (e.g., a text message, an alarm, etc.) to a user device associated with the mobile phone number. In some implementations, monitoring server 240 may communicate with a location services device to determine user devices located within a particular distance from the facility and to provide those user devices with alerts regarding the alarm signal.

As described above, monitoring server 240 may receive an alarm signal in the form of a packet-based message from an alarm panel 220 that provides alarm signals in the form of a DTMF type signal. In some implementations, alarm systems having alarm panels 220 that provide alarm signals in the form of a DTMF type signal may be retrofitted such that monitoring server 240 may receive, via a packet-based network, a packet-based message identifying an alarm signal.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   providing, by a computing device, a synchronization signal to an alarm receiving device;
   receiving, by the computing device, an analog alarm signal from the alarm receiving device based on providing the synchronization signal to the alarm receiving device;
   identifying, by the computing device, one or more sets of digits based on the analog alarm signal;
   determining, by the computing device, that an entire portion of the analog alarm signal has been received based on an audio pattern of the analog alarm signal;
   providing, by the computing device, a sign-off signal based on determining that the entire portion of the analog alarm signal has been received,
      the sign-off signal preventing the alarm receiving device from resending at least the entire portion of the analog alarm signal, and
      the sign-off signal being provided in a form of an audible burst of sound to indicate the sign-off signal;
   generating, by the computing device, a packet-based message based on the one or more sets of digits; and
   providing, by the computing device, the packet-based message to a server device associated with an alarm monitoring station,
      the packet-based message containing information that is used to identify the analog alarm signal or used to respond to the analog alarm signal.

2. The method of claim 1, where the analog alarm signal is a dual-tone multi-frequency signal.

3. The method of claim 1, where the packet-based message is provided to the server device via a packet-based network.

4. The method of claim 1, further comprising:
   receiving a call instruction from the alarm receiving device; and
   determining that the call instruction includes a telephone number associated with the alarm monitoring station,
      where providing the synchronization signal is based on determining that the call instruction includes the telephone number associated with the alarm monitoring station.

5. The method of claim 1, where the synchronization signal directs the alarm receiving device to provide the analog alarm signal.

6. The method of claim 1, where receiving the analog alarm signal is based on the alarm receiving device receiving an electrical signal via one or more terminals of the alarm receiving device.

7. The method of claim 1, where the one or more sets of digits identify one or more of a type of alarm, a zone associated with the analog alarm signal, or an account number of a facility associated with the alarm receiving device or the computing device.

8. A computing device comprising:
   a processor to:
      provide a synchronization signal to an alarm receiving device;
      receive an analog alarm signal from the alarm receiving device based on providing the synchronization signal to the alarm receiving device;
      determine that an entire portion of the analog alarm signal has been received based on an audio pattern of the analog alarm signal;

provide a sign-off signal based on determining that the entire portion of the analog alarm signal has been received,
the sign-off signal preventing the alarm receiving device from resending at least the entire portion of the analog alarm signal, and
the sign-off signal being provided in a form of an audible burst of sound to indicate the sign-off signal;
identify one or more sets of digits based on the analog alarm signal;
generate a packet-based message based on the one or more sets of digits; and
provide the packet-based message to a server device associated with an alarm monitoring station,
the packet-based message containing information that is used to identify the analog alarm signal or used to respond to the analog alarm signal.

9. The computing device of claim 8, where the one or more sets of digits identify one or more of a type of alarm, a zone associated with the analog alarm signal, or an account number of a facility associated with the alarm receiving device or the computing device.

10. The computing device of claim 8, where, when providing the synchronization signal, the processor is to:
receive a call instruction from the alarm receiving device;
determine that the call instruction includes a telephone number associated with the alarm monitoring station; and
provide the synchronization signal based on determining that the call instruction includes the telephone number associated with the alarm monitoring station.

11. The computing device of claim 10, where the call instruction is provided by the alarm receiving device after the alarm receiving device receives an electrical signal via one or more terminals of the alarm receiving device.

12. The computing device of claim 8, where the synchronization signal directs the alarm receiving device to provide the analog alarm signal.

13. The computing device of claim 8, where the analog alarm signal is received as a dual-tone multi-frequency signal.

14. A non-transitory computer-readable medium storing instructions, the instructions comprising:
a plurality of instructions which, when executed by one or more processors associated with a computing device, cause the one or more processors to:
provide a synchronization signal to an alarm receiving device;
receive an analog alarm signal from the alarm receiving device based on providing the synchronization signal to the alarm receiving device;
determine that an entire portion of the analog alarm signal has been received based on an audio pattern of the analog alarm signal;
provide a sign-off signal based on determining that the entire portion of the analog alarm signal has been received,
the sign-off signal preventing the alarm receiving device from resending at least the entire portion of the analog alarm signal, and
the sign-off signal being provided in a form of an audible burst of sound to indicate the sign-off signal;
identify one or more sets of digits based on the analog alarm signal;
generate a packet-based message based on the one or more sets of digits; and
provide the packet-based message to a server device associated with an alarm monitoring station,
the packet-based message containing information that is used to identify the analog alarm signal or used to respond to the analog alarm signal.

15. The non-transitory computer-readable medium of claim 14, where the one or more sets of digits identify an account number of a facility associated with the alarm receiving device or the computing device.

16. The non-transitory computer-readable medium of claim 14, where one or more instructions, of the plurality of instructions, to provide the synchronization signal comprise:
one or more instructions that, when executed by the one or more processors, cause the one or more processors to:
receive a call instruction from the alarm receiving device;
determine that the call instruction includes a telephone number associated with the alarm monitoring station; and
provide the synchronization signal to the alarm receiving device based on determining that the call instruction includes the telephone number associated with the alarm monitoring station,
the synchronization signal directing the alarm receiving device to provide the analog alarm signal.

17. The non-transitory computer-readable medium of claim 14, where one or more instructions, of the plurality of instructions, to provide the synchronization signal comprise:
one or more instructions that, when executed by the one or more processors, cause the one or more processors to:
receive a call instruction from the alarm receiving device after the alarm receiving device receives a signal from a sensor device that identifies an occurrence of an event at a facility,
answer a call associated with the call instruction, and
provide the synchronization signal based on answering the call.

18. The non-transitory computer-readable medium of claim 14, where the alarm receiving device provides the analog alarm signal based on receiving an electrical signal from a sensing device via one or more terminals of the alarm receiving device.

19. The non-transitory computer-readable medium of claim 18, where the sensing device provides the electrical signal based on detecting an occurrence of an event at a facility.

20. The non-transitory computer-readable medium of claim 14, where the analog alarm signal is a dual-tone multi-frequency (DTMF) signal.

* * * * *